(12) United States Patent
Kobayashi et al.

(10) Patent No.: US 6,751,332 B2
(45) Date of Patent: Jun. 15, 2004

(54) SPEAKER

(75) Inventors: Takashi Kobayashi, Yamanashi-ken (JP); Yoshizumi Ohta, Yamanashi-ken (JP); Kazumi Miyamoto, Yamanashi-ken (JP)

(73) Assignee: Citizen Electronics Co., Ltd., Fujiyoshida (JP)

( * ) Notice: Subject to any disclaimer, the term of this patent is extended or adjusted under 35 U.S.C. 154(b) by 197 days.

(21) Appl. No.: 09/988,269

(22) Filed: Nov. 19, 2001

(65) Prior Publication Data
US 2002/0064293 A1 May 30, 2002

(30) Foreign Application Priority Data
Nov. 30, 2000 (JP) ........................................ 2000-366372

(51) Int. Cl.⁷ ............................................. H04R 25/00
(52) U.S. Cl. ...................... 381/386; 381/189; 381/409; 381/396; 381/394; 381/398; 181/171

(58) Field of Search ................................. 381/386, 189, 381/409, 396, 394, 398, 391; 181/171, 172

(56) References Cited
U.S. PATENT DOCUMENTS 5,892,185 A * 4/1999 Takahashi et al. .......... 181/171
6,400,825 B1 * 6/2002 Miyamoto et al. .......... 381/409

* cited by examiner

Primary Examiner—Curtis Kuntz
Assistant Examiner—Tuân DuéNguyen
(74) Attorney, Agent, or Firm—Dennison, Schultz, Dougherty & MacDonald

(57) ABSTRACT

A speaker has a case having a peripheral projection, a yoke made of magnetic material and secured to the case, and a permanent magnet provided in the case. A vibrating plate having a peripheral projection is secured to an outside wall of the case at the peripheral projection. A protector plate is secured to the case.

2 Claims, 4 Drawing Sheets

SPEAKER

BACKGROUND OF THE INVENTION

The present invention relates to a speaker used in a portable communication equipment such as a portable telephone and other equipments.

Referring to FIGS. 4 and 5 showing a conventional speaker, a yoke 2 made of magnetic material is embedded in a case 1 made of plastic by insert molding. A permanent magnet 3 is secured to the yoke 2, and a top plate 4 made of magnetic material is adhered to the magnet 3 to form a magnetic circuit and to form a magnetic gap between the top plate 4 and the yoke 2.

A vibrating plate 6 is secured to the case 1 at a shoulder 1b of the periphery thereof. A voice coil 5 secured to the underside of the vibrating plate 6 is inserted in the magnetic gap. A protector 7 made of metal is secured to the case 1, interposing the vibrating plate 6. A plurality of sound discharge holes are formed in the case 1 and the protector 7. The vibrating plate 6 and the protector 7 are positioned by a cylindrical peripheral projection 1a.

A pair of ends 9 of the voice coil 5 are adhered to the underside of the vibrating plate 6 as shown in FIG. 4. Each of the ends 9 is outwardly extended from the case 1 passing through a groove 1c formed in a peripheral wall of the case. On the underside of the case 1, a substrate 8 made of plastic is adhered, and a pair of terminal plates 10 are secured to the substrate 8. Each of the terminal plate has a V-shape and each end 9 is connected to one of the branches of the terminal plate 10 by solder 11. The other branch of the terminal plate 10 is used for connecting the end 9 to a circuit of the equipment to be mounted therein.

Thus, when a signal current is applied to the voice coil 5 through the terminal plates 10, the vibrating plate 6 vibrates to produce sounds.

Another conventional speaker shown in FIG. 6 is different from the above described speaker in that a case comprises a lower case 22 and an upper case 23. The upper case 23 has a peripheral projection 23a and a shoulder 23b.

The vibrating plate 6 is positioned by the peripheral projection 23a and the peripheral portion of the vibrating plate 6 is adhered to the shoulder 23b. The protector 7 is secured to the periphery of the vibrating plate 6.

The ends 9 of the voice coil 5 projected from a groove 23c formed in the upper case 23 are connected to the terminal plates of the substrate 8. The lower and upper cases 22 and 23 are adhered by an adhesive.

In the above described conventional speakers, the vibrating plate 6 is positioned by the peripheral projection 1a (23a) and secured to the shoulder 1b (23b). Therefore, the effective diameter of the vibrating plate 6 is reduced by double of width of the shoulder 1b. In order to improve the quality of the sound produced by the speaker, it is necessary to increase the diameter of the vibrating plate. However, the reducing of the diameter of the vibrating plate causes the quality of the produced sound to deteriorate.

SUMMARY OF THE INVENTION

An object of the present invention is to provide a speaker which may obviate the above described trouble.

According to the present invention, there is provided a speaker comprising a case having a peripheral projection, a yoke made of magnetic material and secured to the case, a permanent magnet provided in the case, a vibrating plate having a cylindrical periphery and secured to the case at the peripheral projection, a voice coil secured to an underside of the vibrating plate, and a protector plate secured to the case.

In an aspect of the present invention, the cylindrical periphery of the vibrating plate is adhered to the outside wall of the peripheral projection of the case.

In another aspect of the present invention, the cylindrical periphery of the vibrating plate is adhered to the inside wall of the peripheral projection of the case.

A peripheral portion of the vibrating plate is mounted on a top edge formed on an upper portion of the peripheral projection of the case.

The protector plate has a cylindrical periphery which is adhered to the outside wall of the cylindrical periphery of the vibrating plate.

These and other objects and features of the present invention will become more apparent from the following detailed description with reference to the accompanying drawings.

DETAILED DESCRIPTION OF THE PREFERRED EMBODIMENT

Figure 1:
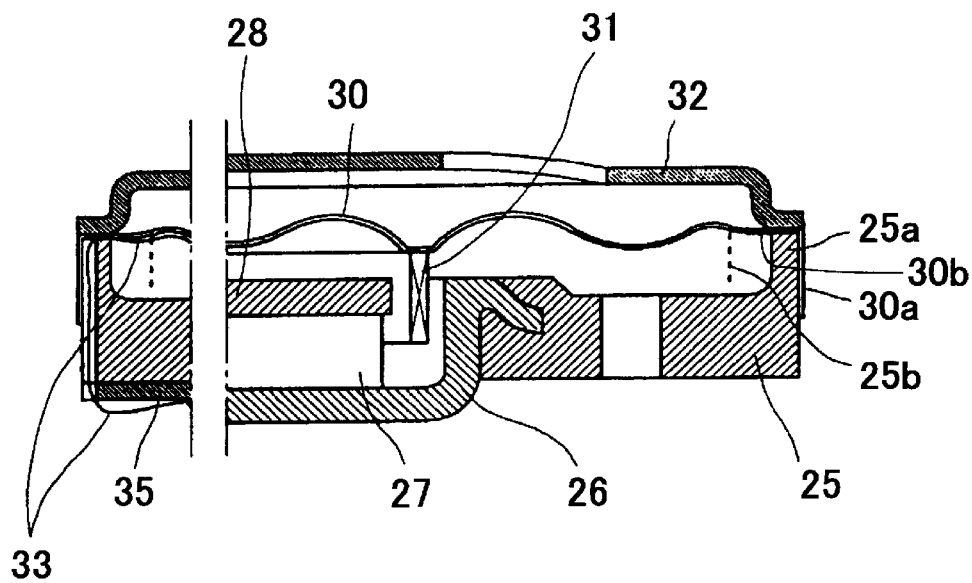
FIG. 1 is an enlarged sectional view showing a main part according to a first embodiment of the present invention.

Referring to FIG. 1, a cylindrical case 25 made of plastic has a peripheral projection 25a having a flat top surface. The top surface has a width considerably smaller than that of the peripheral projection indicated by a reference numeral 25b of the conventional speaker. The speaker comprises a yoke 26 made of magnetic material and embedded in the case 25 by insert molding, a permanent magnet 27 secured to the yoke 26, and a top plate 28 adhered to the magnet 27.

A vibrating plate 30 has a downwardly extending cylindrical periphery 30a. The vibrating plate 30 is adhered to the case 25 at a peripheral portion 30b engaged with the top surface of the peripheral projection 25a and at the cylindrical periphery 30a. A voice coil 31 secured to the underside of the vibrating plate 30 is inserted in the magnetic gap between the top plate 28 and the yoke 26. A protector plate 32 made of metal is secured to the vibrating plate 30 at the peripheral portion 30b. A plurality of sound discharge holes are formed in the case 25 and the protector plate 32.

Figure 5:
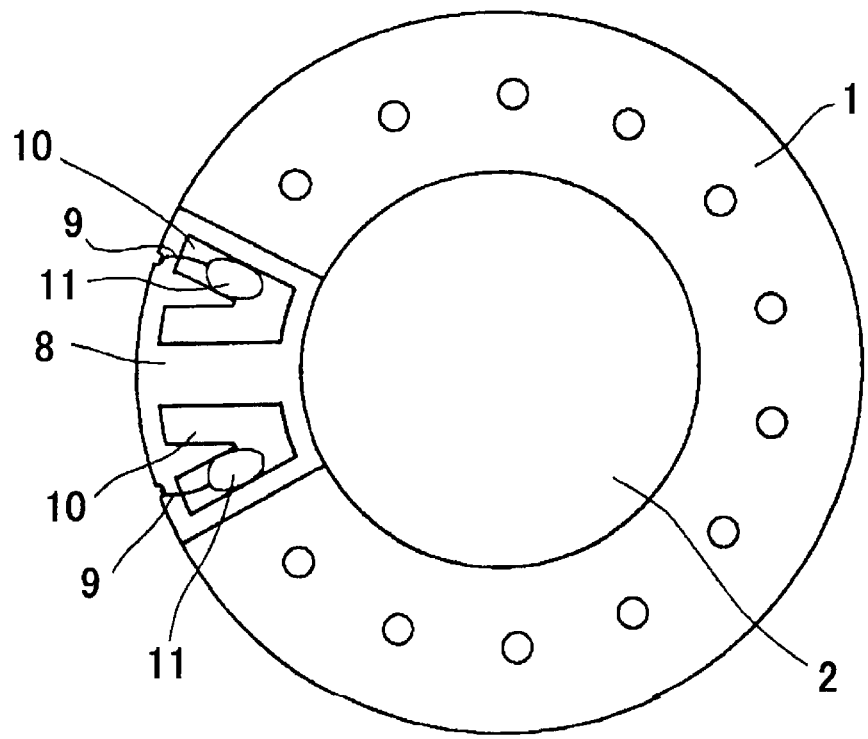
FIG. 5 shows an underside of the speaker of FIG. 4.
Figure 6:
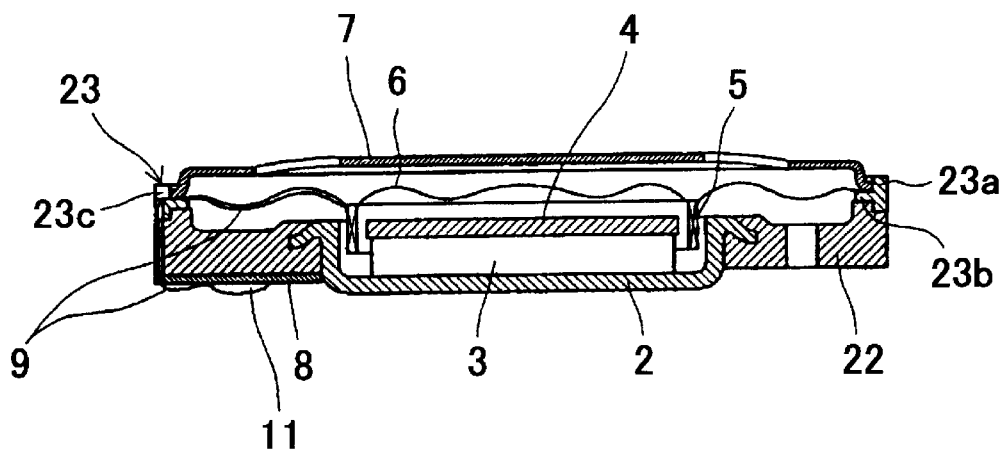
FIG. 6 is a sectional view of another conventional speaker.

A pair of ends 33 of the voice coil 31 are adhered to the underside of the vibrating plate 30. Each of the ends 33 is outwardly extended from the case 25 passing through a groove formed in a peripheral wall of the case, and bent along the peripheral wall of the case and fixed to a terminal plate on a substrate 35 by solder. The terminal plate has the same shape as the conventional terminal plate 10 of FIG. 5. The terminal plate is contacted with a terminal of an equipment in which the speaker is mounted.

The vibrating plate 30 is accurately centered by the engagement of the cylindrical periphery 30a with the outside wall of the case 25. Since the top surface of the peripheral projection 25a is not formed with a shoulder, the width of the top surface can be largely reduced compared with the width of the conventional peripheral projection indicated by the reference numeral 25b.

Thus, it is possible to provide a speaker producing a high-quality sound. If the width of the top surface of the peripheral projection 25a is reduced, the adhesion strength at the peripheral portion 30b of the vibrating plate 30 reduces. However, since the cylindrical periphery 30a is adhered to the case, the adhesion strength does not reduce.

Figure 2:
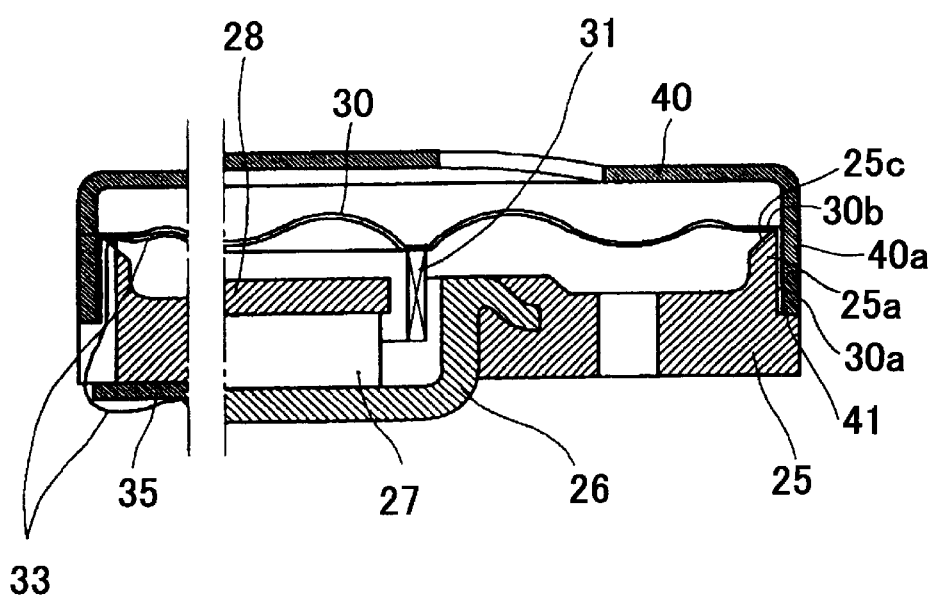
FIG. 2 is an enlarged sectional view showing a main part according to a second embodiment of the present invention.

Referring to FIG. 2 showing the second embodiment, a protector plate 40 also has a cylindrical periphery 40a. The lower end of the cylindrical periphery 40a is engaged with a shoulder 41 formed on the outside wall of the case 25 so that the height of the protection plate 40 is determined. The cylindrical periphery 40a is adhered to the cylindrical periphery 30a of the vibrating plate 30.

In the embodiment, it is not necessary to adhere the peripheral portion 30b of the vibrating plate 30 to the top surface of the peripheral projection 25a. Consequently, a large part of the top surface is formed into an inwardly and downwardly inclined surface 25c. The peripheral portion 30b of the vibrating plate 30 is mounted on the sharp top edge. Thus, an effective area of the vibrating plate can be further increased.

Figure 3:
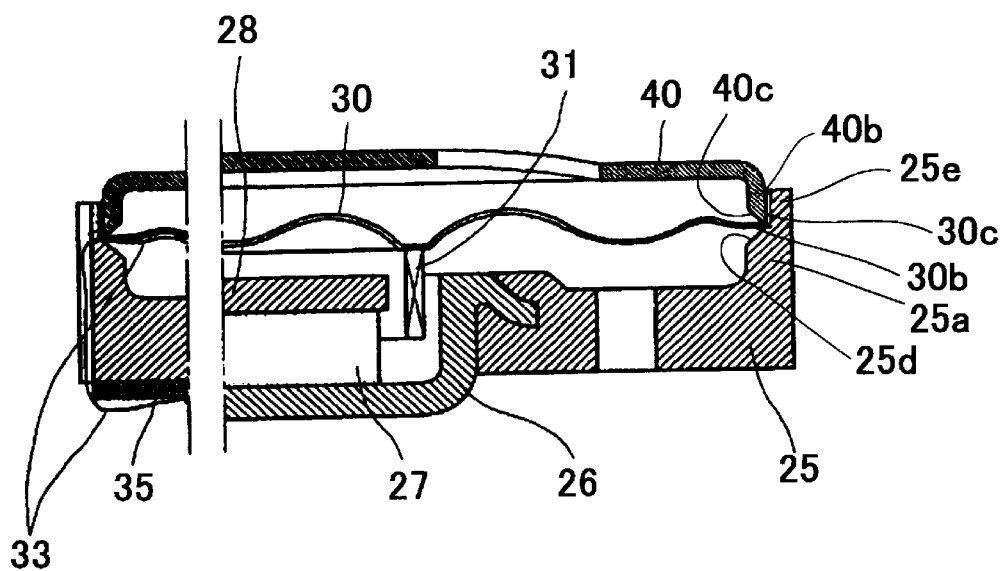
FIG. 3 is an enlarged sectional view showing a main part according to a third embodiment of the present invention.
Figure 4:
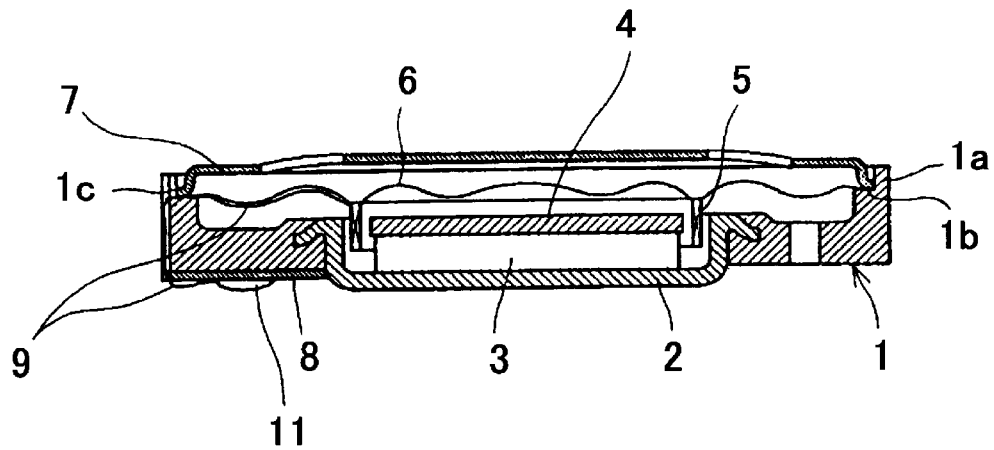
FIG. 4 is a sectional view of a conventional speaker.

Referring to FIG. 3 showing the third embodiment, the peripheral projection 25a of the case 25 has an inwardly and downwardly inclined surface 25d forming a very small top surface and has an annular projection 25e. The vibrating plate 30 has an upwardly extending cylindrical periphery 30c, and the protector plate 40 has a cylindrical periphery 40b. The underside of the cylindrical periphery 40b is formed into a downwardly inclined surface 40c, thereby forming a sharp lower edge.

The peripheral portion 30b of the vibrating plate 30 is mounted on the top surface of the peripheral projection 25a of the case 25, and the cylindrical periphery 30c of the vibrating plate 30 is adhered to the inside wall of the annular projection 25e. The sharp lower edge of the protector plate 40 is mounted on the peripheral portion 30b of the vibrating plate 30. The outside wall of the cylindrical periphery 40b is adhered to the inside wall of the cylindrical periphery 30c of the vibrating plate 30.

The effective diameter of the vibrating plate 30 is increased similarly to the second embodiment.

In accordance with the present invention, the effective diameter of the vibrating plate can be increased, so that the quality of the produced sound can be improved.

While the invention has been described in conjunction with preferred specific embodiment thereof, it will be understood that this description is intended to illustrate and not limit the scope of the invention, which is defined by the following claims.

What is claimed is:

1. A speaker comprising:
    a cylindrical case having an outside wall;
    a yoke made of magnetic material and secured to the case;
    a permanent magnet provided in the case;
    a vibrating plate comprising a downwardly bent cylindrical periphery having an inside wall, wherein the inside wall of the downwardly bent cylindrical periphery is secured to the outside wall of the case to secure the vibrating plate to the case;
    a voice coil secured to an underside of the vibrating plate; and
    a protector plate secured to the case.

2. The speaker according to claim 1 wherein the protector plate has a downwardly bent cylindrical periphery adhered to an outside wall of the downwardly bent cylindrical periphery of the vibrating plate.

* * * * *